United States Patent [19]

Maehata et al.

[11] Patent Number: 4,789,938

[45] Date of Patent: Dec. 6, 1988

[54] ANTI-SKID CONTROL WITH FAIL-SAFE FUNCTION

[75] Inventors: Hiromi Maehata; Yutaka Okuda, both of Kariya; Shoichi Masaki, Satoshi Hirano; Anjo; Ken Asami; Kazunori Sakai, all of Nagoya, all of Japan

[73] Assignees: Nippondenso Co., Ltd., Kariya; Toyota Jidosha Kabushiki Kaisha, Toyota, both of Japan

[21] Appl. No.: 833,230

[22] Filed: Feb. 26, 1986

[30] Foreign Application Priority Data

Mar. 25, 1985 [JP] Japan ................... 60-60496

[51] Int. Cl.⁴ .............................. B60T 8/88
[52] U.S. Cl. .................... 364/426.02; 303/92
[58] Field of Search ............ 364/426, 565, 566; 303/92, 93, 94, 95; 180/197; 361/238

[56] References Cited

U.S. PATENT DOCUMENTS

| | | | |
|---|---|---|---|
| 3,874,743 | 4/1975 | Fleischer et al. | 303/92 |
| 3,883,184 | 5/1975 | Jonner et al. | 303/92 |
| 3,920,284 | 11/1975 | Lane et al. | 303/92 |
| 4,013,324 | 3/1977 | Quon | 303/92 |
| 4,059,312 | 11/1977 | Jonner | 303/92 |
| 4,287,505 | 9/1981 | Ohmori et al. | 303/92 |
| 4,523,791 | 6/1985 | Belart et al. | 303/92 |
| 4,636,009 | 1/1987 | Tsuru et al. | 303/93 |
| 4,665,490 | 5/1987 | Masaki et al. | 364/426 |

FOREIGN PATENT DOCUMENTS

0152101 8/1985 European Pat. Off. .
57-84254 5/1982 Japan .
2109882 6/1983 United Kingdom .

Primary Examiner—Gary Chin
Attorney, Agent, or Firm—Cushman, Darby & Cushman

[57] ABSTRACT

In an anti-skid control system for a motor vehicle there is provided a fail-safe control system for providing a compensation for a proper vehicle braking operation against the occurrence of failure of a hydraulic pressure control valve. The fail-safe control system includes a device for monitoring a control signal for controlling the operation of the control valve so that the hydraulic pressure applied to a wheel braking cylinder is regulated for preventing a wheel of the vehicle from skidding. The monitoring device detects the occurrence of failure of the control valve when the control signal indicative of one of the operation modes of the control valve is continuously generated more than a predetermined time period. In response to the detection, the fail-safe control system switches a directional control valve to the passage-opening condition so that the hydraulic pressure from a master cylinder can directly be applied to the wheel braking cylinder, thereby enabling the braking operation to be controlled by a vehicle driver.

8 Claims, 6 Drawing Sheets

ANTI-SKID CONTROL WITH FAIL-SAFE FUNCTION

BACKGROUND OF THE INVENTION

The present invention relates generally to an anti-skid control system for use in vehicle hydraulic braking systems, and more particularly to such an anti-skid control system with a fail-safe control function for providing a compensation for a safe braking operation in the occurrence of failures of a hydraulic braking device.

Various anti-skid control systems for use in motor vehicles have hitherto been proposed which optimize a hydraulic braking pressure under control of a control unit with a view to providing a more effective and safer braking action in braking the vehicle under varying road suface conditions.

The anti-skid control system would require a fail-safe control function because of the necessity to ensure that the vehicle braking operation can be performed irrespective of the occurrence of failures of a hydraulic braking device. Japanese Patent Provisional Publication No. 57-84254, for example, discloses an anti-skid control system including an vehicle braking compensation device for when failures exist with the hydraulic pressure developing device comprising a hydraulic pressure pump and an accumulator. However, this prior art system does not take into account the vehicle braking compensation in the occurrence of failures of a control valve for controlling the hydraulic pressure applied to the inside of a wheel braking cylinder. Thus, a further improvement would be required from the viewpoint of increase in reliability and safety with respect to the vehicle hydraulic braking system.

SUMMARY OF THE INVENTION

It is therefore an object to provide a new anti-skid control system which is capable of achieving an appropriate backup braking operation where no sufficient hydraulic pressure can apply to a wheel braking cylinder due to failture of a hydraulic pressure control device, particularly, a hydraulic pressure control valve.

The technique of the present invention involves monitoring a control signal for controlling a hydraulic pressure control valve for regulating the hydraulic pressure applied to a wheel braking cylinder while a vehicle wheel is in an anti-skid control mode. When it has been found by the monitoring of the control signal that failure exist with an anti-skid control device such as the hydraulic pressure contrl valve, a fail-safe can be performed for the purpose of compensating for a sefe braking operation irrespective of the failure.

More specifically, when the control signal indicative of one of the operation modes of the control valve, i.e., pressure-increasing mode, pressure-maintaining mode and pressure-decreasing mode, is continuously generated more than a predetermined time period, it is determined that the control valve is in a failure condition. In response to the determination, a directional control valve disposed in a hydraulic pressure passage is switched to the passage-opening condition so that the braking hydraulic pressure from a master cylinder can directly be applied to a wheel braking cylinder and therefore a vehicle driver can control the braking operation with the release from the anti-skid control mode, thereby resulting in increase in reliability and safety with respect to the vehicle braking system.

In accordance with the present invention, there is provided an anti-skid control system for a hydraulic braking system of a motor vehicle, comprising: a master cylinder operatively coupled to a brake pedal of the vehicle; a wheel braking cylinder responsive to a hydraulic pressure developed in the master cylinder for braking a wheel of the vehicle; a hydraulic pressure passage provided between the master cylinder and the wheel braking cylinder, the hydraulic pressure passage including a directional control valve having at least first and second positions to open and close the hydraulic pressure passage; a hydraulic pressure supplying device connected through a hydraulic presure control valve to the wheel braking cylinder; means for detecting the speed of the vehicle wheel and generating a signal corresponding to the detected speed of the wheel; comparing means responsive to the signal from the wheel speed detecting means for comparing the detected speed with a reference speed; first control means for generating first and second control signals in accordance with the results of the comparison, the first control signal being supplied to the directional control valve so that the directional control valve is set to the passage-closing position and the second control signal being supplied to the hydraulic pressure control valve to control the hydraulic pressure applied to the wheel braking cylinder; and second control means for monitoring the second control signal to inspect the operating condition of the hydraulic pressure control valve and for switching the directional control valve to the passage-opening condition in response to the occurrence of abnormality of the hydraulic pressure control valve.

In accordance with the present invention there is also provided an anti-skid control system for a hydraulic braking system of a motor vehicle, comprising: a master cylinder operatively coupled to a brake pedal of the vehicle; a wheel braking cylinder responsive to a hydraulic pressure developed in the master cylinder for braking a wheel of the vehicle; a hydraulic pressure passage provided between the master cylinder and the wheel braking cylinder, the hydraulic pressure passage including a directional control valve having at least first and second positions to open and close the hydraulic pressure passage; a hydraulic pressure supplying device connected through a hydraulic presure control valve to the wheel braking cylinder; means for detecting the speed of the vehicle wheel; means for detecting the acceleration of the vehicle wheel; means for comparing the wheel speed and the wheel acceleration with a reference wheel speed and a reference wheel acceleration; first control means for generating first and second control signals indicative of performing an anti-skid control in accordance with the results of the comparison so that the directional control valve is set to the passage-closing position in response to the first control signal and the hydraulic pressure control valve is controlled in response to the second control signal to regulate the hydraulic pressure applied to the wheel braking cylinder to prevent the vehicle wheel from a skidding condition; and second control means for monitoring the second control signal and for switching the directional control valve to the passage-opening condition when the first control means continuously generates the second control signal indicative of one of the operation modes of the hydraulic pressure control valve more than a predetermined time period.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
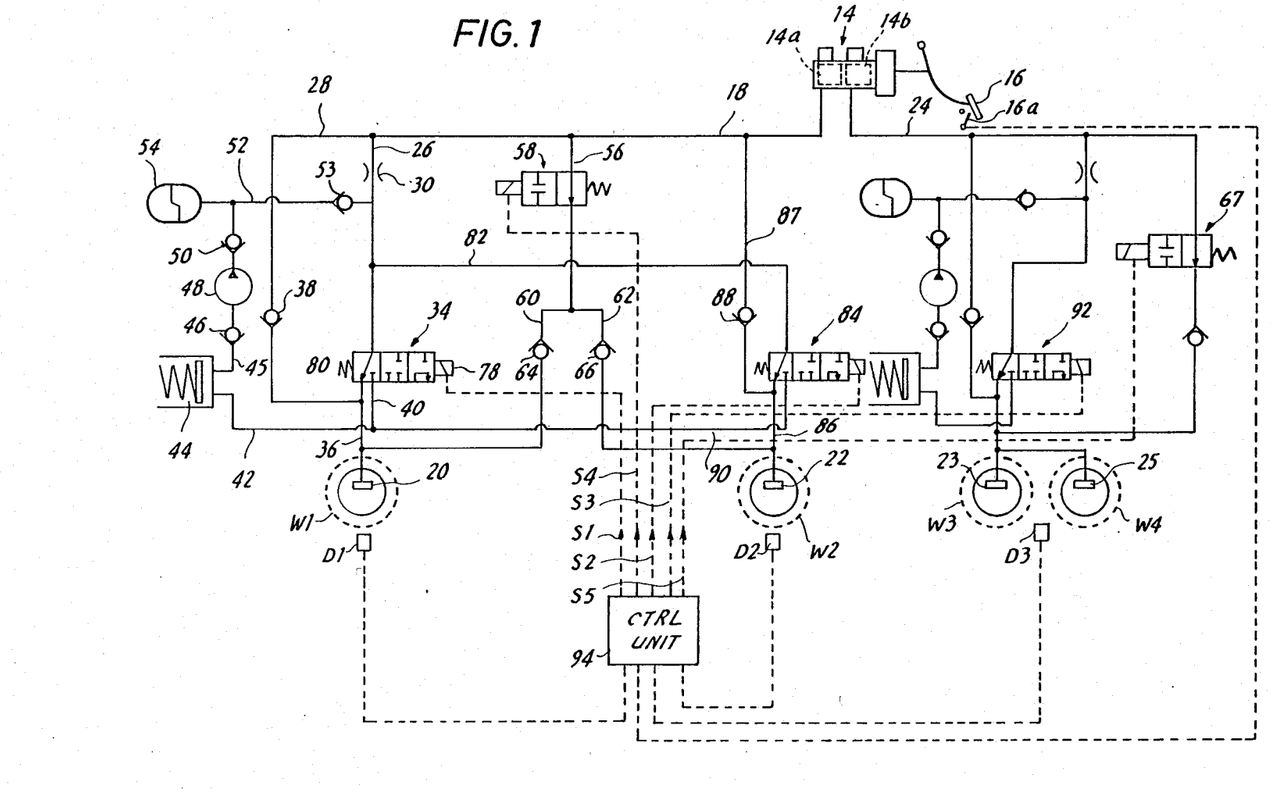
FIG. 1 is a schematic diagram of an anti-skid braking control system according to the present invention incorporated in a vehicle braking system including a hydraulic pressure control system.

Referring now to FIG. 1, there is schematically totally illustrated a hydraulic pressure control system for vehicle anti-skid braking operation including a master cylinder 14 operatively coupled to a brake pedal 16. The master cylinder 14 has a first hydraulic pressure developing chamber 14a connected through a pipeline 18 to wheel braking cylinders 20, 22 for respectively performing the braking operation of a front-left wheel W1 and a front-right wheel W2, and further has a second hydraulic pressure chamber 14b connected through a pipeline 24 to wheel braking cylinders 23, 25 for respectively effecting the braking operation of a rear-left wheel W3 and a rear-right wheel W4. More specifically, the pipeline 18 is branched into a pressurized liquid suplying pipeline 26 and a pressurized liquid return pipeline 28. The pressurized liquid supplying pipeline 26 communicates through a restriction 30 with a hydraulic pressure control valve 34, and reaches wheel braking cylinder 20 with a pipeline 36 interposed therebetween.

On the other hand, the pressurized liquid return pipeline 28 is coupled through a check valve 38 and the pipeline 36 to wheel braking cylinder 20 for braking operation of front-left wheel W1. The check valve 38 allows the liquid to flow only in a direction from wheel braking cylinder 20 to master cylinder 14.

The hydraulic pressure control valve 34 is connected to a pipeline 40, which is coupled through a pipeline 42, a reservoir 44, a pipe line 45, a check valve 46, a hydraulic pressure pump 48, a check valve 50, and a return pipeline 52 to the pressurized liquid supplying pipeline 26. The return pipeline 52 is coupled to a check valve 53 which allows the liquid to flow only in a direction from hydraulic pressure pump 48 to supplying pipeline 26. An accumulator 54 is connected to the return pipeline 52 provided between the check valves 50 and 53. The return pipeline 52 is coupled to supplying pipeline 26 at a point between the restriction 30 and hydraulic pressure control valve 34. Therefore, the restriction 30 is located between master cylinder 14 and a node between return pipeline 52 and supplying pipeline 26. The accumulator 54 is arranged to have a liquid storage capacity slightly smaller than the maximum amount of liquid discharged from wheel braking cylinder 20 in one pressure-decreasing stroke (about 60% in the illustrated embodiment). The check valves 46 and 50, as well as check valve 53, are both arranged so as to allow the liquid to flow only in a direction in which liquid is discharged by the hydraulic pressure pump 48. The check valve 46 serves as an intake valve of the pump 48 and is incorporated therein, while the check valve 50 acts as a discharge valve thereof and is also built therein.

The hydraulic pressure control valve 34 is a spring offset type solenoid-operated valve with three ports and three positions. In operation, when a high exciting current is passed through a solenoid 78 of the valve 34, a plunger of the valve 34 is operated in a direction against the biasing force of a spring 80 of valve 34 so as to take the rightmost position (in Figure), when a low exciting current is supplied thereto, the valve 34 takes an intermediate position, and when no exciting current flows through solenoid 78, the plunger is moved under the force of spring 80 so that the valve 34 takes the leftmost position (in Figure).

To the wheel braking cylinder 22 for the front-right wheel W2, there is connected a pressurized liquid supplying pipeline 82 branched from the pressurized liquid supplying pipeline 26 through a hydraulic pressure control valve 84 identical structually and functionally to the hydraulic pressure control valve 34, and a pipeline 86. The wheel braking cylinder 22 is also connected to master cylinder 14 through a return pipeline 87 branched from the pipeline 18, a check valve 88, and a pipeline 86. A pipeline 90 connected to hydraulic pressure control valve 84 is coupled through the pipeline 42 to the reservoir 44.

A pipeline 56 branched from pipe 18 connected to master cylinder 14 is coupled through a two-position two-port type directional control valve 58 to pipelines 60 and 62. The pipelines 60 and 62 are respectively coupled via check valves 64 and 66 to the pipelines 36 and 86 and reach the wheel braking cylinders 20 and 22, respectively. The check valves 64 and 66 are oriented to allow the liquid to flow only toward the wheel braking cylinders 20 and 22. A two-position two-port type directional control valve 58 is set to a normal position to allow the liquid to pass therethrough, and is set to a liquid-passing state in response to the energization of a solenoid thereof caused by a signal S4 from a control unit 94 (which will be hereinafter described).

The arrengement, including pipelines and hydraulic pressure control parts, from a pipeline 24 to the wheel braking cylinders 23 and 25 for the rear-left wheel W3 and rear-right wheel W4 is made in the same manner as that for the wheel braking cylinders 20 and 22, except that two wheel braking cylinders are connected to one hydraulic pressure control valve 92. A two-position two-port type directional control valve 67 is arranged to have the same construction as that of the directional control valve 58, and is set to a cut-off condition in response to the energization of a solenoid thereof caused by a signal S5 from the control unit 94 and is normally set to a passing-through condition. Similarly, it is also possible to use two hydraulic pressure control valves and respectively connect to the wheel braking cylinders for the rear wheels W3 and W4.

Wheel speed sensors D1 and D3 are associated respectively with the front-left wheel W1 and front-right wheel W2, and one wheel sensor D3 is associated with the rear wheels W3 and W4. The wheel sensors D1, D2 and D3 generate pulse signals having frequencies corresponding to the speeds of rotation of the wheels, followed by supplying such pulse signals to the control unit 94.

Figure 2:
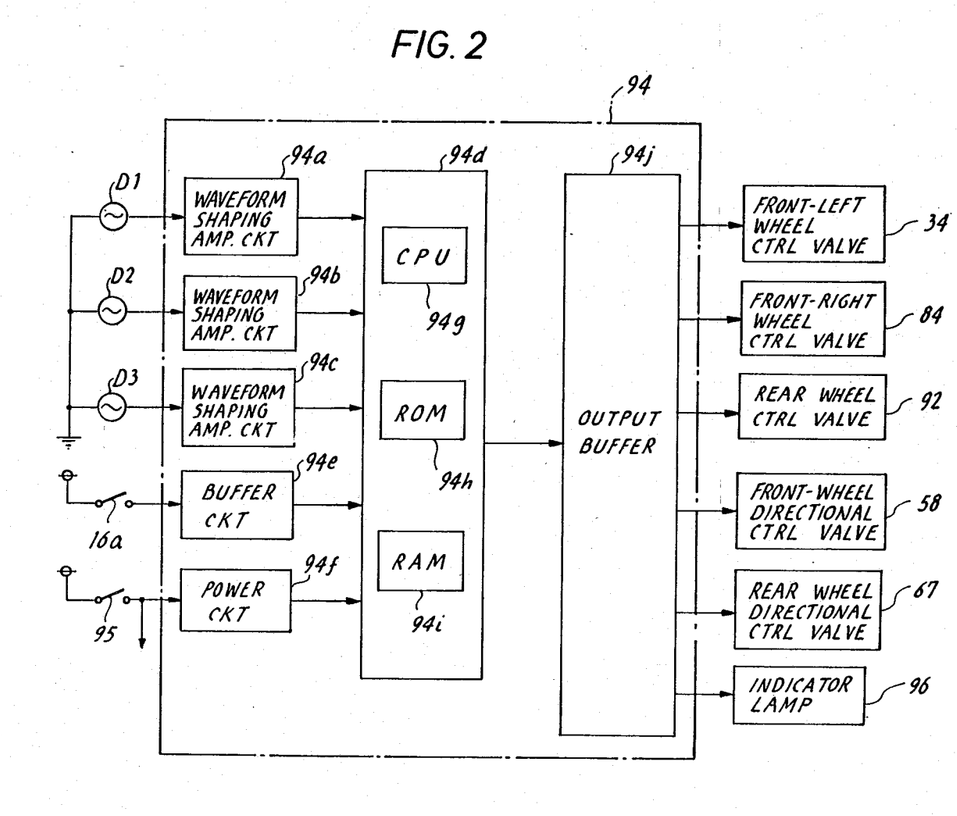
FIG. 2 is an illustration of the detail of the control unit of FIG. 1.

The control unit 94 has a circuit arrangement as shown in FIG. 2, where waveform shaping amplifier circuits 94a through 94c are included for the purpose of enabling pulse signals from the wheel speed sensors D1, D2 and D3 to be processed by a microcomputer 94d. Also included a buffer circuit 94e electrically coupled to a stop switch 16a and a power circuit 94f arranged so as to supply a constant voltage to the microcomputer 94d and so on in response to the turn-on of an ignition switch 95. The microcomputer 94d comprises a central processing unit (CPU) 94g, a ramdom access memory (RAM) 94h, a read-only memory (ROM) and so on, and outputs a control signal through the output buffer 94j. An indicator lamp 96 is coupled through the output buffer 94j to the microcomputer 94d and acts as an indication of a abnormal condition of the anti-skid control apparatus.

The control unit 94 is responsive to the input signals to compute wheel speeds, slipe rates, decelerations an so on as a function of the input signals and to generate control signals S1, S2, S3, S4 and S5 for fail-safe control in accordance with the computation. The control signals S1, S2 and S3 are supplied to the solenoids of the hydraulic pressure control valves 34, 84 and 92. When the control signal is of a high level, the solenoid exciting current is of a high level. The control signal with an intermediate level causes the solenoid exciting current with a intermediate level. The control signal with a low level leads to the solenoid exciting current with zero level. Therefore, the hydraulic pressure control valves 34, 84 and 92 take different positions in accordance with the levels of the control signals S1, S2 and S3. The control signals become high in level when reducing the braking liquid pressures of the wheel braking cylinders 20 and 22, become intermidiate in level when maintaining the braking liquid pressure, and become low in level when increasing the braking liquid pressure. The hydraulic pressure control valve 92 for the rear wheels W3 and W4 is operated in the same manner as in the braking operation for the front wheels W1 and W2.

On the other hand, the control signals S4 and S5 are generated to switch the two-position two-port directional control valves 58 and 67 to the cut-off positions, respectively, only when the vehicle is in an anti-skid control condition, i.e., when the hydraulic pressure control valves 34, 84 and 92 are respectively switched between pressure-increasing, pressure-maintaining, and pressure-decreasing modes for controlling the braking liquid pressure. When being in a normal running condition or a fail-safe condition, the directional control valves are respectively switched to passing-through positions.

Operation of the hydraulic pressure control system including an anti-skid control system according to an embodiment of the present invention thus arranged is as follows:

(I) Normal Braking Mode

In response to the operation of the brake pedal 16 by a driver, the braking liquid pressure is delivered from master cylinder 14 through pipelines 18 and 56, directional control valve 58 and branched pipelines 60 and 62 to wheel braking cylinders 20 and 22, thereby braking the front wheels W1 and W2. As in the case of the front wheels W1 and W2, the braking liquid pressure for braking the rear wheels W3 and W4 is also delivered from master cylinder 14 through directional control valve 67 to the wheel braking cylinders 23 and 25. Since the braking liquid pressure is fed via directional control valves 58 and 67 to each the wheel braking cylinder, the provision of the restrictions in the pressurized liquid supplying pipelines does not adversely affect the quick increase of liquid pressure in the wheel braking cylinders.

(II) Anti-skid Control Mode

Figure 3:
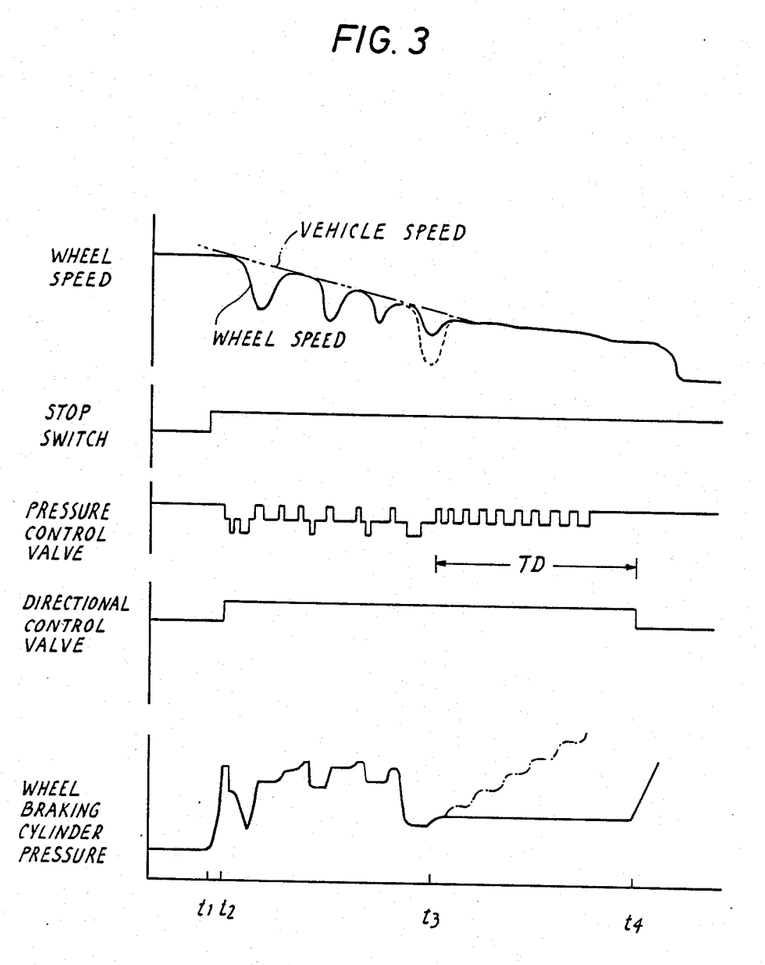
FIG. 3 is a graphic illusration useful for describing the operation of an anti-skid control system and the occurence of abnormality of a hydraulic pressure control valve for the anti-skid control.

FIG. 3 is an illustration for describing the anti-skid control operation. A driver now starts depressing the brake pedal 16 while the motor vehicle is running at a constant speed. At the time t1 of starting the braking action, the stop switch 16a is turned on and, at the same time, the control unit 94 is responsive to detected signals from the wheel speed sensors D1, D2 and D3 for determining that each wheel does not reach a predetermined deceleration and slip rate. The determination causes the generation of low level control signals S1, S2 and S3. Therefore, the control valves 34, 84 and 92 of FIG. 2 are respectively positioned to the spring side and set to pressure-increasing modes. Thus, the braking liquid from the master cylinder 14 is supplied through the pipeline 18, pipeline 56, pipelines 60 and 62, check valves 64 and 66, supplying pipeline 26, control valve 34, supplying pipeline 82, control valve 84, and pipeline 86 to the wheel braking cylinders 20 and 22, resulting in braking the front wheel W1 and W2. The braking liquid therefrom is resisted by check valves 38 and 88 to flow toward pipelines 36 and 86. The direction control valve 58 is cut off when the deceleration of the wheels W1 and W2 reach a predetermined amount. The braking liquid pressure is delivered through the above-mentioned path until reaching the predetermined deceleration amount. The rear wheels W3 and W4 are braked in the same manner.

With increase in the braking liquid pressure, at the time t2, the front wheels W1 and W2 reach and further exceed the predetermined deceleration or slip rate. The generation of each the control signals causes closing the directional control valves 58 and 67 and starting an anti-skid control. The hydraulic pressure control valves 34 and 84 are operated to be shifted from the intermediate position (pressure-maintaining position) to the solenoid side position so that the pipelines 26, 36 and pipelines 82, 86 are respectively disconnected and, on the other hand, the pipelines 36, 40 and pipelines 86, 90 are respectively connected, thereby setting to the pressure-decreasing mode. As a result, the braking liquid in the wheel braking cylinder 20 is delivered through the pipelines 36, 40 and 42 into the reservoir 44, while the braking liquid in the wheel braking cylinder 22 is also delivered through the pipelines 86, 90 and 42 thereinto. The hydraulic pressure pump 48 is arranged to operate when either the control signals S1 or S2 becomes high in level, so that the braking liquid is pumped thereby from the reservoir 44 and then delivered through the check valve 50 and return pipeline 52 into the accumulator 54. The liquid is supplied thereto up to its maximum storage capacity, and the excessive liquid is delivered to the pressurized liquid supplying pipeline 26.

At this time, the pressure energy of the braking liquid is stored in the accumulator 54. The liquid pressure in the accumulator 54 is smaller than that in the master cylinder 14 while the delivered amount of the braking liquid exceeds the capacity of the accumulator 54, and therefore no braking liquid flows back into the supplying pipeline 26, resulting in the prevention of a kickback. The braking liquid overflowing from the accumulator 54 is supplied to the pressurized liquid supplying pipeline 26 under pressure.

When the deceleration of the front wheels W1 and W2 is restored to the predetermined level and further becomes lower than the level, the control signals have the medium level to set the hydraulic pressure control valves 34 and 84 to the intermediate position, whereby the pipelines 26, 36, 40, 82, 86 and 90 are respectively cut off and the braking liquid pressure is maintained constant, that is, the pressure-maintaining mode is established.

On releasing from the skidding condition of the front wheels W1 and W2, the control signals S1 and S2 again go low in level to provide liquid communication between the pipelines 26, 36 and the pipelines 82, 86 to allow the liquid pressure to go from the accumulator 54 through the pipelines 26 and 82 into the pipelines 36 and 86, respectively, resulting in increase in the bgraking power for the front wheels W1 and W2, that is, setting to the pressure-incresing mode.

Repeating the above-described control, the vehicle is controlled to run at a desired speed or stop.

At the time t3 shown in FIG. 3, it is assumed that the hydraulic pressure control valve 34 for the front-left wheel is brought into a sticking condition in the pressure-maintaining mode and thus it is impossible to switch to the pressure-increasing mode. The wheel speed is scarcely decreased because the liquid pressure in the wheel braking cylinder 20 does not increases at this time. Therefore, a control signal indicative of the pressure-increasing mode is repeatedly supplied to the control valve 34. When the control signal is continuously generated more than a predetermined time period, the liquid pressure in the wheel braking cylinder 20 is expected to gradually increase as indicated by a dashed line in FIG. 3 and reach a value exceeding the liquid pressure in the master cylinder 14. However, the liquid pressure cannot be actually increased in disregard of continuous generation of the control signal. Therefore, the control signal indicative of switching to the pressure-increasing mode is continuously generated more than a predetermined time period TD, it is determined that the hydraulic pressure control valve 34 is in a trouble condition or the vehicle is released from the braking operation by a driver, and according to the determination the two-position directional control valve 58 is turned to the passing-through condition at the time t4, FIG. 3. In response to the operation, the liquid pressure in the master cylinder 14 is directly applied to the wheel braking cylinder 20 to perfrom the braking operation. This is, a fail-safe is achieved against the trouble of hydraulic pressure control valve 34, thereby resulting in increase in reliability and safety in terms of vehicle braking. However, in the present embodiment, there is an possibility in which the front-right wheel W2 in a normal controlled condition is also locked together with the front-left wheel W1 when the directional control valve 58 is set to the passing-through condition because the directional control valve 58 is commonly used for both front wheels W1 and W2. Therefore, it is necessary to properly set the predetermined time period TD.

It is possible that the directional control valve 38 is switched to the passing-through condition on elapsing by the time at which the liquid pressure in the wheel braking cylinder is equal to that of the master cylinder.

As seen from FIG. 1 that in response to the discontinuation of braking operation the liquid pressure in the wheel braking cylinders is equal to the pressure in the master cylinder after the elapse of a given time period.

A further detailed description of the embodiment of the present invention will be made with reference to FIGS. 4 through 7.

When the ignition switch 95, FIG. 2, is turned on, a constant voltage produced by the power circuit $94f$ is applied to the microcomputer $94d$ and the CPU $94g$ thereof executes a control process in accordance with a program in advance stored in the ROM $94h$.

Figure 4:
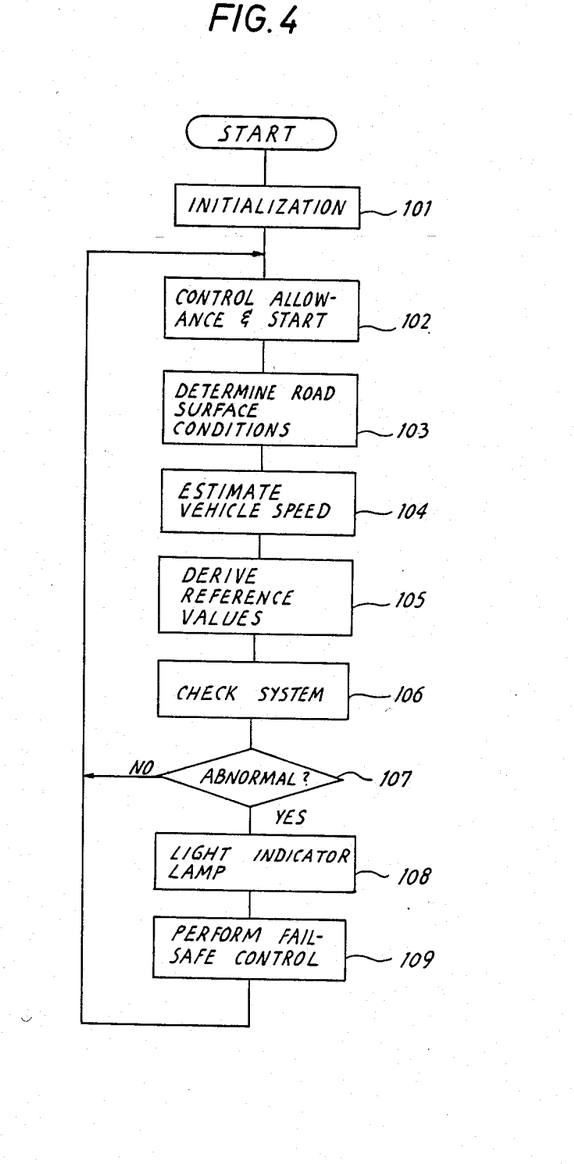
FIG. 4 is an illustration of a flow chart discribing the operation executed by the control unit of FIG. 2.

FIG. 4 is a schematic flow chart describing the programmed steps of the microcomputer according to the present invention.

The program begines with a step 101 in which the initialization is first executed for the following executions, for example, where various flags (will be described hereinafter) are reset, and the initialization step 101 is followed by a step 102 for allowing the execution of control in response to the braking action by a driver (the time t1 in FIG. 3) and for permitting the anti-skid control to start whereby the directional control valves are switched to the cutoff condition (the time t2 in FIG. 3), wherein an allowance flag $F_{act}$ is set in response to the allowance of control execution and a start flag $F_{sta}$ is set in response to the start of the anti-skid control.

A subsequent step 103 is provided for determining a road condition, on which a vehicle is at present running, in accordance with coefficient of friction and the degree of irregularity of the road surface. For example, the determination may be made by selecting one from among the following road conditions: a high friction way represented by dry concrete way; a medium friction way represented by a wet asphalt way; a low friction way including an ice way; a good way scarcely having the irregularity; a bad way having a rugged surface; an extremely bad way having an extremely rugged surface such as a corrugated surface.

That is, the determination of the road condition in the step 103 is made by the comparison between wheel speed, wheel acceleration, reference speed and reference acceleration for each the wheel, wheel speed Vw and wheel acceleration being derived as a function of output signals from the wheel speed sensors D1 to D3, reference acceleration data being stored in the ROM $94h$, and reference speed data being obtained in a step 105 (will be hereinafter described). The comparison may be effected by using an up-down counter.

A step 104 is executed for estimating a vehicle speed. For example, the estimation is made on the basis of three speed values derived from the signals from the wheel speed sensors D1 to D3. One corresponding to a medium value from among the three wheel speeds is determined as the estimation vehicle speed while the allowance flag $F_{act}$ is reset. On the other hand, one corresponding to a maximum value from among them is determined as the estimation vehicle speed while the flag $F_{act}$ is in the set condition.

A subsequent step 105 is provided for calculating a reference speed. A reference speed for the determination of control start is calculated until the flag $F_{sta}$ is switched from the reset condition to the set condition, while calculated using a predetermined equation as a function of at least an estimated vehicle speed after the flag $F_{sta}$ has been set, that is, after an anti-skid control operation is started are a reference speed for preventing the hydraulic pressure control valves 34, 84, 92 from malfunction caused by road surface noises (vehicle vibration), electric noises, a reference speed used as a factor for the start determination of pressure-decreasing, a reference speed for detecting a medium friction way, and a reference speed for detecting a low friction way. In the equation for the calculation of the control start determination reference speed, the value of a minuend can be varied in accordance with a road condition obtained in the running road determination step 103 for in advance preventing at least one of the hydraulic pressure control valves 34, 84, 92 from undesirably starting the pressure-decreasing due to, particularly, a soft braking operation while running on a bad way. Similarly, regarding to the noise prevention reference speed and the pressure-decreasing determination reference speed, their minuends can be varied in accordance with the degree of irregularity, thereby making possible to prevent an excessive decrease of pressure due to an over-control.

A step 106 is executed to check whether the main section of the braking control system is in an abnormal condition. In the step 106, the check is made by comparing data corresponding to the normal operating condition of a system element which is in advance stored in the ROM 94h with data indicative of an operating condition of the system element which is obtained in operation. As a result of the comparison, when the abnormality has been found, an abnormality flag is set which indicates that the system is in an abnormal condition, while, if not, the flag is maintained in the reset condition.

The step 106 is followed by a step 107, in which it is checked whether or not the abnormality flag is set. If the flag is not set, the operational flow returns to the step 102. If it is set, a step 108 follows to indicate the occurrence of abnormality of the system, i.e., the malfunction of the anti-skid control system to the driver. The indication is made by putting a light to the indicator lamp 96, FIG. 2. The indicator lamp 96 is operated only when the abnormality of the system is first found.

In the step 108, it is also possible to put out the light of the indicator lamp 96 where the system naturally returns to the normal operating condition.

The step 108 is followed by a step 109 in which fail-safe is performed in response to the abnormal operating condition. In the step 109, the braking system is released from the anti-skid control and is switched to the normal braking mode in which the braking operation is made in accordance with the operating degree of the brake pedal 16 as long as the abnormality is eliminated. Therefore, in operation, each the hydraulic pressure control valve is switched to the pressure-increasing mode and the two-position directional control valves 58 and 67 are respectively switched to the passing-through condition.

Figures 5, 6:
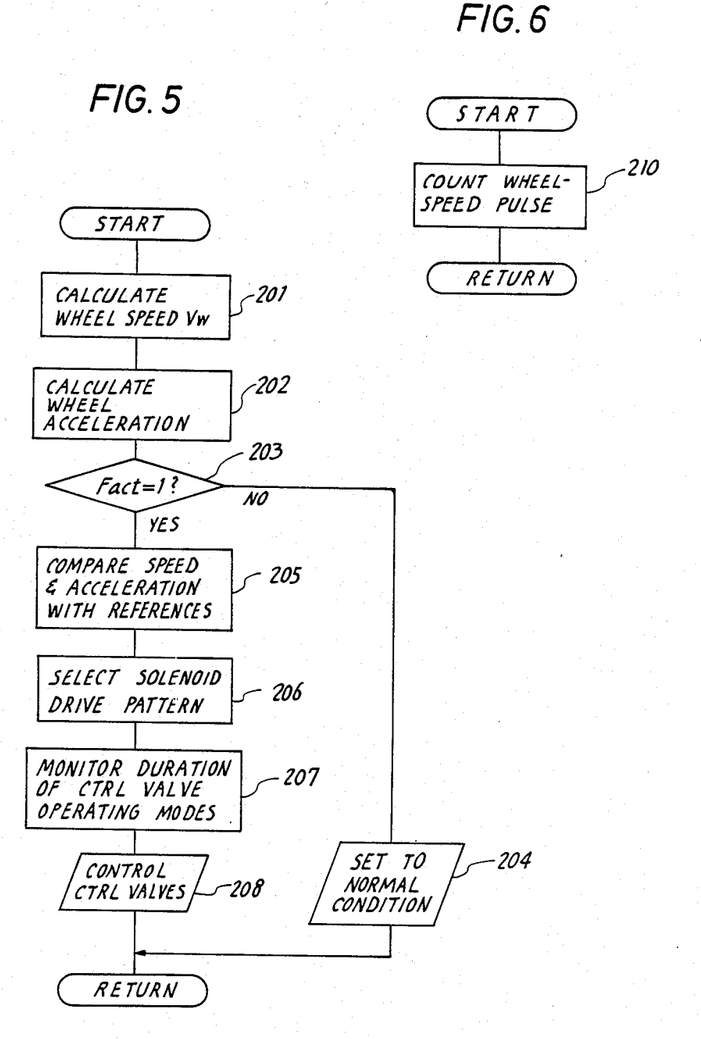
FIG. 5 is a flow chart illustrating a timer interrupt routine.
FIG. 6 is a flow chart illustrating a wheel speed interrupt routine.

FIG. 5 is a flow chart illustrating a timer interrupt routine which is executed at a predetermined interval during the program execution of the routine of FIG. 4.

The interrupt routine starts with a step 201 in which wheel speed is determined for each of the wheels. In step 201, the wheel speed is calculated using a predetermined equation on the basis of the difference between a count value of wheel speed pulses generated in the current execution and that of wheel speed pulses produced in the present execution, time interval of counting, and constant. If required, further included is the execution for averaging a plurality of wheel speed data successively obtained by calculation. The counting of the wheel speed pulses is executed in a wheel speed interrupt routine which will be hereinafter described.

A subsequent step 202 is executed to calculate wheel acceleration for each wheel. In step 202, the wheel acceleration is calculated using a predetermined equation on the basis of the difference between the wheel speed obtained in the present execution of the step 201 and the wheel speed obtained in the previous execution thereof, time, and constant. If necessary, the averaging is executed as in the case of the step 201 so that it is possible to detect the wheel acceleration with more high accuracy.

A step 203 is provided for checking whether the allowance flag $F_{act}$ is set. If not, namely indicating that the stop switch is not turn on, control goes to a step 204. If so, the step 203 is followed by a step 205.

In the step 204, in response to the resetting of the flag $F_{act}$, a control signal is generated so that the hydraulic pressure control valves 34, 84 amd 92 are respectively deactuated to the non-operating condition. That is, the control of the braking liquid pressure is performed in the normal mode. The step 204 is followed by returning to the operation of FIG. 4.

On the other hand, in the step 205 executed where the flag $F_{act}$ has been set, the microcomputer compares the wheel speed and the wheel acceleration obtained in the wheel speed calculation step 201 and the wheel acceleration calculation step 202 with the reference speed derived in the reference speed calcuration step 105 of FIG. 4 and the reference acceleration established in advance, respectively.

A step 206 follows to select the drive pattern of the solenoid of each of the hydraulic pressure control valves in accordance with the results of the comparison executed in the previous step 205. The drive patterns of the respective solenoids are in advance stored in the ROM94h.

A step 207 checks abnormality of the anti-skid braking system. The check is made by monitoring the duration of each of the pressure-increasing mode, pressure-maintaining mode, and pressure-decreasing mode, and the abnormality is determined when the monitored duration of the pressure-decreasing mode exceeds a predetermined duration. The predetermined duration is determined in consideration of the duration generally required in the nornal anti-skid control operation.

In response to the occurrence of the abnormality, the step 207 is followed by a step 208 in which the drive patterns of the hydraulic pressure control valves 34, 84 and 92 are respectively switched to the pressure-increasing mode, and the two-position directional control valves 58 and 67 are respectively switched to the passing-through condition whereby the hydraulic pressure of the master cylinder 14 is directly applied to the wheel braking cylinders 20 and 22. After the completion of execution of the step 208, the operational flow returns to the step of FIG. 5 which has interrupted for the execution of the interrupt routine of FIG. 5.

FIG. 6 illustrates a wheel speed interrupt routine executed corresponding to each of the wheel speed sensors D1, D2 and D3. When the signal from each of the sensor is supplied through the waveform shaping amplifier circuit to the microcomputer 94d, the execution of the routine of FIG. 4 is interrupted and then the execution of this wheel speed interrupt routine is started. In consideration of the simultaneously occurrence of the wheel speed pulses, priority is provided between the three wheel speed interrupt routines.

The step 210 of this interrupt routine is provided for counting the wheel speed pulses. The count value is used for the execution of the step 201 of the timer interrupt routine of FIG. 5 as described above.

Figure 7:
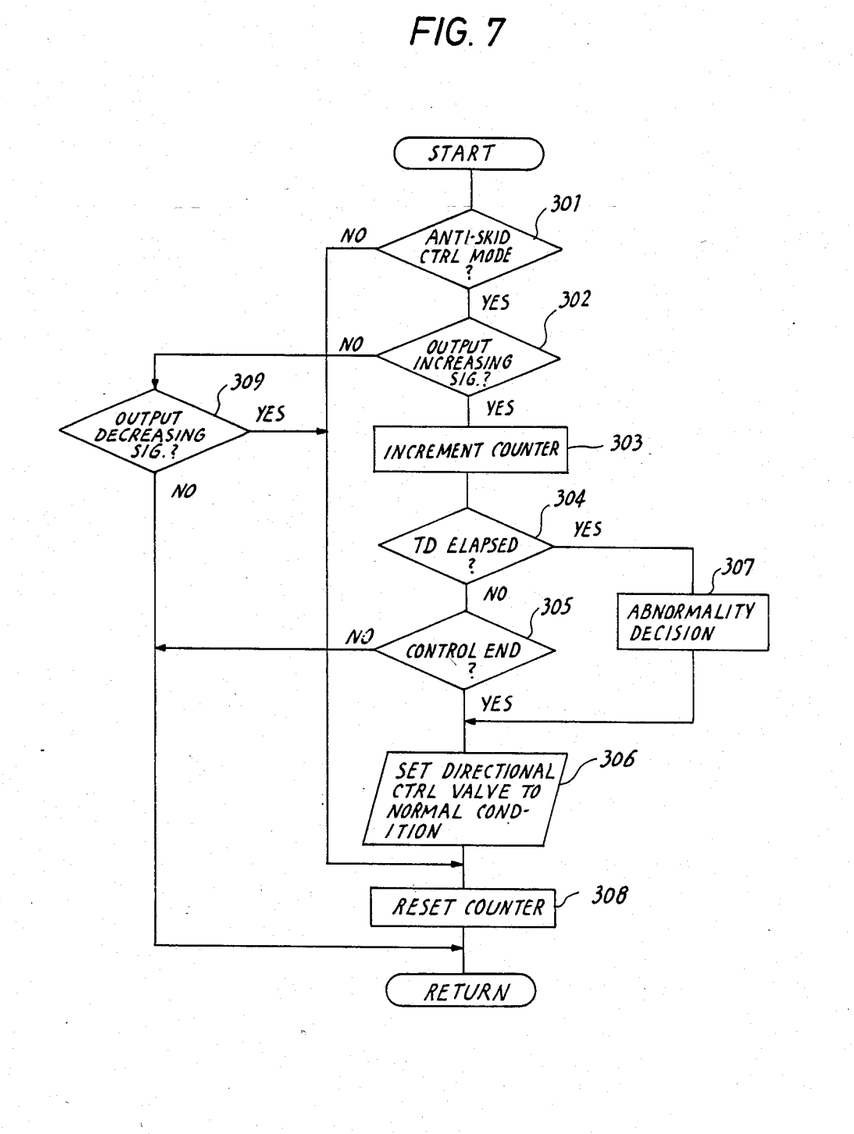
FIG. 7 is an illustration of a flow chart describing the operation mainly executed in the step 106 of the routine of FIG. 4.

FIG. 7 is a flow chart for describing with respect to a part for the front-left wheel W1 of the control performed in the steps 106 and 109 of the routine of FIG. 4.

In a step 301, the microcomputer checks whether the braking system is in the anti-skid control mode. If so, a step 302 follows to check whether a control signal indicative of the braking liquid pressure increasing mode is fed to the hydraulic pressure control valve 34. If supplied, a step 303 follows to increment a counter. In a subsequent step 304, the microcomputer checks in accordance with the count value whether the duration of generation of the control signal indicative of the pressure-increasing mode is in excess of a predetermined time period TD. If elaped above the time period TD, the microcomputer determines the abnormality of the braking system in a step 307, and then switches the directional control valve to the passing-through condition. If not elapsed, a step 305 is executed to check the completion of anti-skid control for the front wheels W1 and W2. This check is executed for the purpose of quickly switching the directional control valve 58 to the normal condition in a subsequent step 306 in response to the completion of the anti-skid control, i.e., relaxation of the braking operation or stoppage of the vehicle running. The checking method involves comparing the count value of front-left wheel speed pulses with that of front-right wheel speed pulses. As a result of the comparison, for example, when both are equal, it is assumed that the braking operation is softened.

In the step 305, when it is determined that the braking system is in the anti-skid control condition, the steps 301 through 305 are repeatedly executed until the elapse of the time period TD is determined in the step 304. Therefore, in the step 307, in the case that the flag indicating that the anti-skid control is not normally performed is set, the abnormality decision is made in the step 106 of FIG. 4 and fail-safe is performed in the step 109 thereof.

On the other hand, when it is determined in the step 301 that the braking system is not in the anti-skid control mode, when the decision in the step 305 is positive, and when the decision in a step 309 is "YES", i.e., a control signal indicative of the pressure-decreasing mode is supplied to the hydraulic pressure control valve 34, control goes to a step 308 in which the counter is reset for the next fail-safe decision.

Therefore, according to the above-described embodiment of the present invention, when liquid pressure is not normally supplied from the hydraulic pressure source to the wheel braking cylinders due to failures of the control valve during anti-skid control, the hydraulic pressure is directly supplied from the master cylinder to the wheel braking cylinders so that a fail-safe is performed, thereby resulting in increase in reliability and safety with respect to the anti-skid control.

It is to be understood that the invention is not limited in its application to the details of construction and arrangement of pars illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. A braking system with an anti-skid device for a motor vehicle, comprising:
    a master cylinder operatively coupled to a brake pedal of said vehicle;
    at least two braking cylinders each associated with a wheel of the vehicle and each responsive to a hydraulic pressure developed in said master cylinder, each for braking said associated wheel of said vehicle;
    hydraulic pressure passage means, provided between said master cylinder and said two wheel braking cylinders, said hydraulic pressure passage means including a single directional control valve having at least a first passage opening position and a second passage closing position to open and close said hydraulic pressure passage means, respectively, said single directional control valve being arranged to be common for all of said wheel braking cylinders;
    a hydraulic pressure supplying device connected through a number of hydraulic pressure control valves to said at least two wheel braking cylinders, the number of said hydraulic pressure control valves being determined in accordance with the number of said wheel braking cylinders;
    means for detecting a speed of at least one of said vehicle wheels and generating a signal corresponding to the detected speed of said wheel;
    comparing means, responsive to said signal from said wheel speed detecting means, for comparing the detected speed with a predetermined reference speed;
    first control means for determining if anti-skid control for said vehicle should be performed, in accordance with said comparing of said comparing means, and generating first and second control signals, said first control signal being supplied from said first control means to said single directional control valve to command said single directional control valve to switch from said passage-opening position to said passage-closing position, and said second control signals being supplied to said hydraulic pressure control valves to control the hydraulic pressures to be applied to said wheel braking cylinders on the basis of a hydraulic pressure from said hydraulic pressure supplying device so as to approach predetermined values, respectively; and
    second control means, coupled to said first control means, for receiving said second control signals to monitor operating conditions of each of said hydraulic pressure control valves to determine any of said hydraulic pressure control valves to be in an abnormal condition when each of said second control signals indicative of a specific valve-operating mode being successively supplied to said second control means for a predetermined time period, said second control means generating a third control signal in response to the abnormal condition of at least one of said hydraulic pressure control valves to command said single directional control valve to be switched to the passage-opening condition.

2. A braking system with an anti-skid device for a motor vehicle, comprising:
- a master cylinder operatively coupled to a brake pedal of said vehicle;
- at least two wheel braking cylinders each associated with a wheel of the vehicle and each responsive to a hydraulic pressure developed in said master cylinder for braking at least two wheels of said vehicle;
- hydraulic pressure passage means provided between said master cylinder and said two wheel braking cylinders, said hydraulic pressure passage means including a single directional control valve having at least a first passage open position and a second passage closing position to open and close said hydraulic pressure passage means, respectively, said single directional control valve being arranged to be common for all of said wheel braking cylinders;
- a hydraulic pressure supplying device connected through at least two hydraulic pressure control valves to said at least two wheel braking cylinders, the number of said hydraulic pressure control valves being determined in accordance with the number of said wheel braking cylinders;
- means for detecting a speed of at least one of said vehicle wheels;
- means for detecting an acceleration of said at least one vehicle wheel;
- comparing means for comparing said wheel speed and said wheel acceleration with a predetermined reference speed and a predetermined reference wheel acceleration;
- first control means for determining if anti-skid control for said vehicle should be performed in accordance with said comparing of said comparing means and generating first and second signals, said first control signal being supplied therefrom to said single directional control valve to switch said single directional control valve from said passage-opening position to said passage-closing position and said second control signal being supplied to said hydraulic pressure control valves so that said hydraulic pressure control valves are controlled in response to said second control signals to regulate the hydraulic pressures applied to said wheel braking cylinders to prevent said vehicle wheels from being in a skidding condition, each of said control signals performing a switching operation among pressure-controlling modes of each of said hydraulic pressure control valves so as to cause a hydraulic pressure applied to each of said wheel braking cylinders to approach a predetermined value; and
- second control means coupled to said first control means for receiving each of said second control signals to monitor the operating condition of each of said hydraulic pressure control valves and determining whether each of said hydraulic pressure control valves is in an abnormal condition, the abnormality of said hydraulic pressure control valve being determined when said second control signal indicative of a specific pressure-controlling mode being successively supplied to said second control means for a predetermined time period, said second control means generating a third control signal in response to said abnormal condition of said at least one hydraulic pressure control valve, so that said single directional control valve is switched to the passageopening condition.

3. A braking system as claimed in claim 2, wherein said predetermined reference wheel speed and said predetermined reference acceleration are determined on the basis of the condition of a road on which said vehicle is running.

4. A braking system as claimed in claim 3, wherein said road condition is estimated in accordance with the detected wheel speed and wheel acceleration.

5. A braking system as claimed in claim 2, wherein said second control means includes means for indicating said abnormal condition of said hydraulic pressure control valve to a driver of said vehicle.

6. A braking system as claimed in claim 2, wherein said first control means controls said hydraulic pressure control valve in accordance with the results of the comparison between the detected wheel speed and acceleration and said reference wheel speed and reference acceleration, respectively.

7. A braking system as claimed in claim 2, wherein said specific pressure controlling mode is a pressure-increasing mode for increasing the hydraulic pressure applied to said wheel braking cylinder.

8. A braking system as claimed in claim 7, wherein said second control means includes means for counting said second control signal indicative of said pressure-increasing mode generated therefrom.

* * * * *